(No Model.) 2 Sheets—Sheet 1.
W. A. PATTERSON.
STORAGE CONDENSER AND LINT COTTON CONVEYER.
No. 562,338. Patented June 16, 1896.
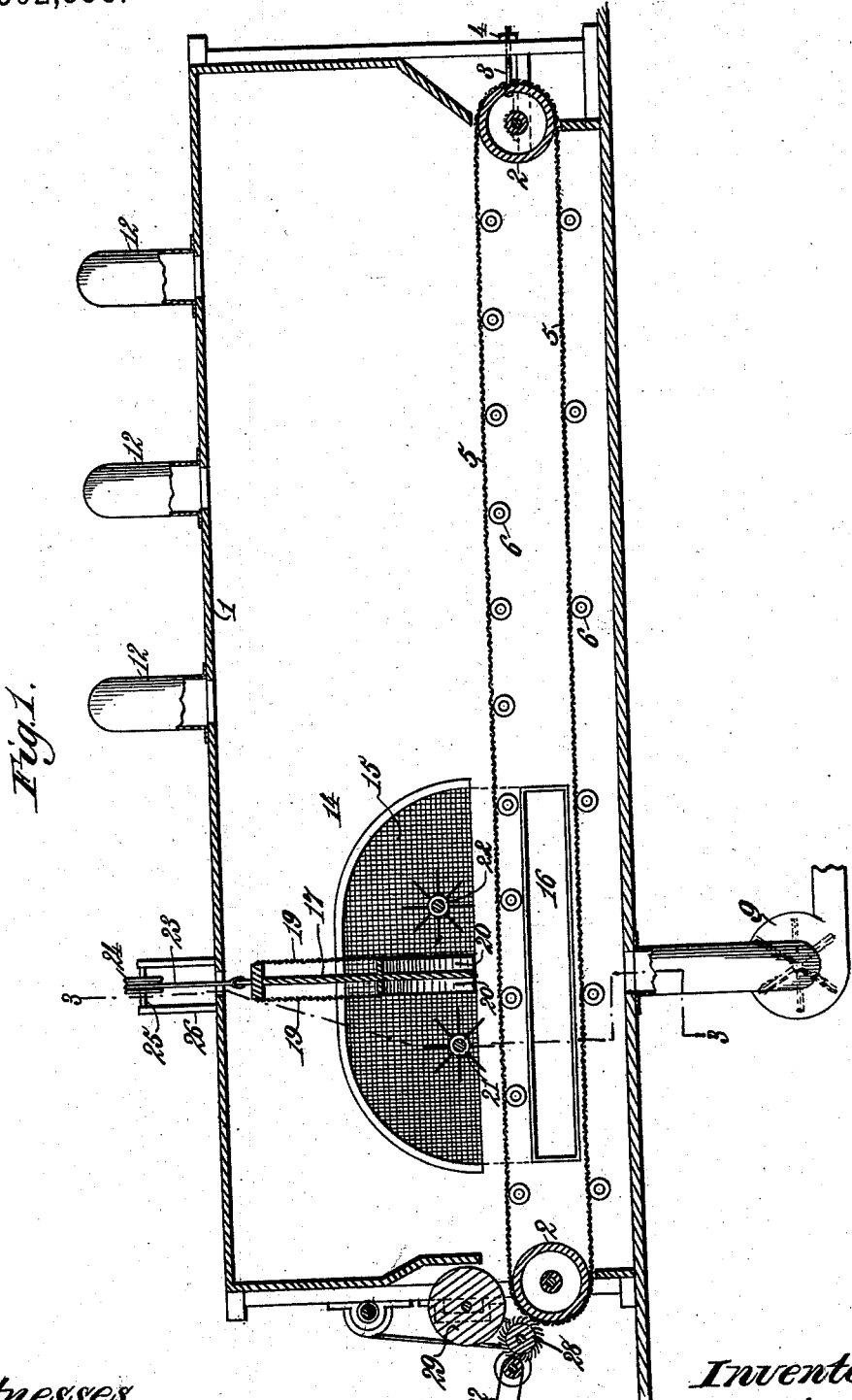
Witnesses.
Robert Everett,
Geo. N. Rea.
Inventor:
Warren A. Patterson,
By James L. Norris,
Atty.

(No Model.) 2 Sheets—Sheet 2.
W. A. PATTERSON.
STORAGE CONDENSER AND LINT COTTON CONVEYER.
No. 562,338. Patented June 16, 1896.
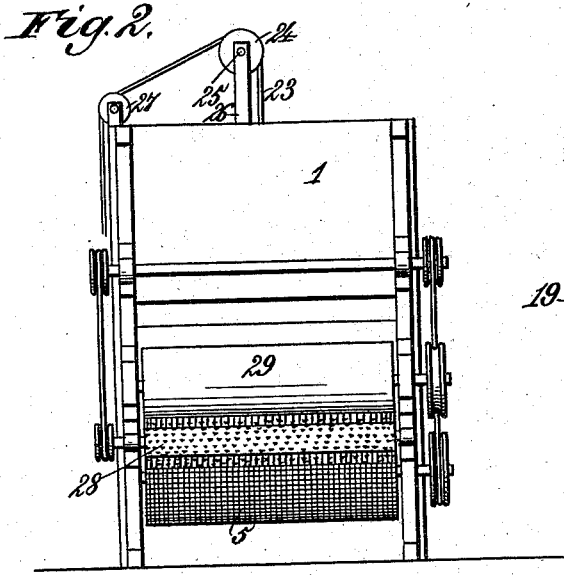
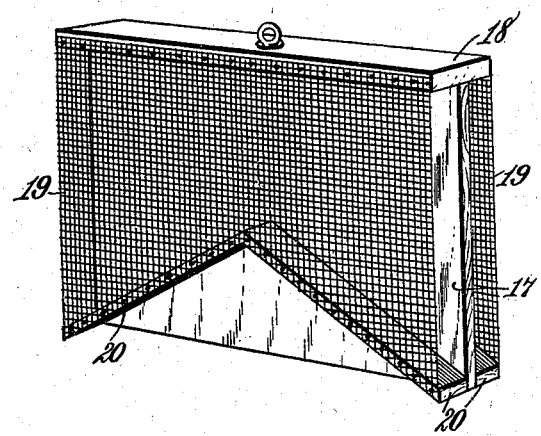
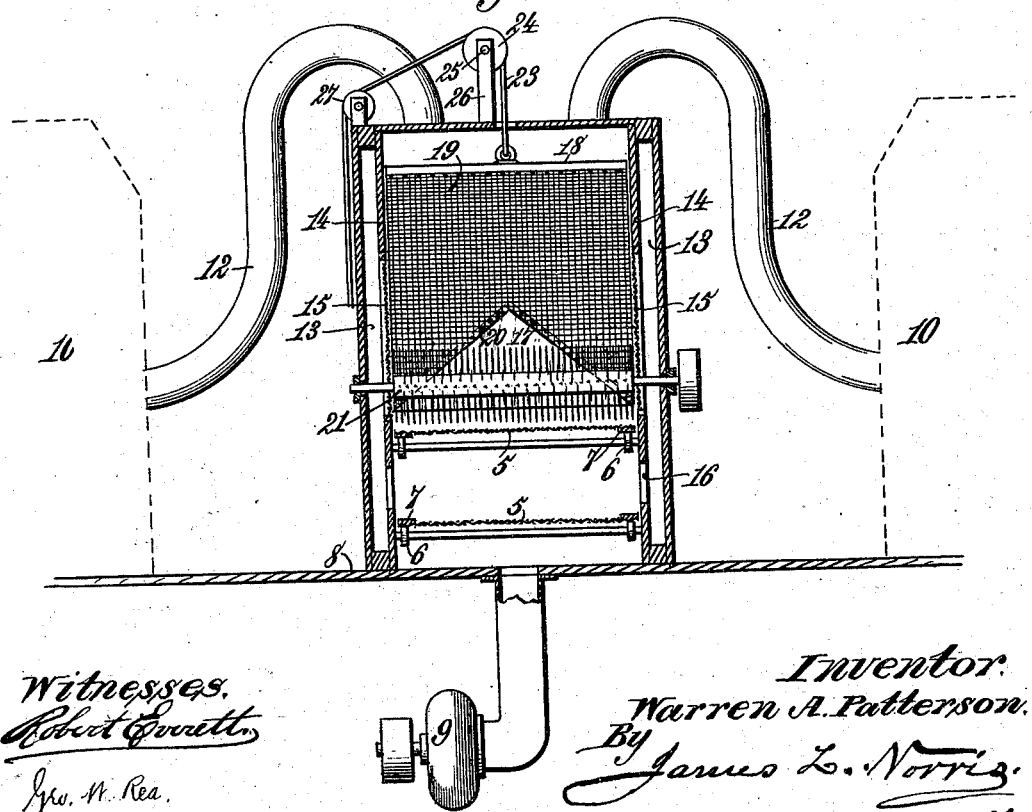
Witnesses.
Robert Everett.
Geo. W. Rea.
Inventor.
Warren A. Patterson.
By James L. Norris.
Atty.

UNITED STATES PATENT OFFICE.

WARREN A. PATTERSON, OF WACO, TEXAS.

STORAGE-CONDENSER AND LINT-COTTON CONVEYER.

SPECIFICATION forming part of Letters Patent No. 562,338, dated June 16, 1896.

Application filed October 24, 1895. Serial No. 566,776. (No model.)

*To all whom it may concern:*

Be it known that I, WARREN A. PATTERSON, a citizen of the United States, residing at Waco, in the county of McLennan and State of Texas, have invented new and useful Improvements in Storage-Condensers and Lint-Cotton Conveyers, of which the following is a specification.

This invention relates to that class of storage-condensers and lint-cotton conveyers comprising a casing or trunk, lint-cotton inlets, an endless foraminous conveyer-belt traveling within the casing or trunk, and foraminous drums or cylinders located in juxtaposition to air-outlets for the purpose of rapidly disposing of the large body of air introduced into the casing or trunk by the gins while preventing the escape of the lint-cotton through the air-outlets, as described and shown in the application for patent filed June 13, 1895, Serial No. 552,724, by John S. Tennison, assignor to myself, and in my application for patent filed September 23, 1895, Serial No. 563,386.

The objects of my present invention are to improve and simplify the machines above referred to; to more efficiently clean the cotton in transit to the cotton compress or baling mechanism; to avoid the employment of the rotary foraminous drums or cylinders; to cause the air within the casing or trunk to carry with it all dirt and impurities from the cotton as such air is withdrawn; and to regulate the quantity of cotton supplied by the conveyer-belt to the cotton compress or baling mechanism. To accomplish all these objects, my invention involves the features of construction, the combination or arrangement of parts, and the principles of operation hereinafter described and claimed, reference being made to the accompanying drawings, in which—

Figure 1 is a longitudinal sectional view taken vertically through a storage-condenser and lint-cotton conveyer constructed in accordance with my invention. Fig. 2 is an end elevation of the same, looking at the pressing-roller and wiper-roller and omitting the endless belt which receives the cotton from the pressing and wiper rollers. Fig. 3 is a vertical sectional view taken on the line 3 3, Fig. 1; and Fig. 4 is a detail perspective view of the vertically-adjustable bulkhead or partition for retarding the mass of cotton and regulating the supply of the same to the cotton compress or baling mechanism.

In order to enable those skilled in the art to make and use my invention, I will now describe the same in detail, referring to the drawings, wherein—

The numeral 1 indicates a horizontal casing or trunk, which, as here shown, is rectangular or square in cross-section, and which may be of sufficient length to accommodate any desired number of gins constituting a battery or batteries of gins in the plant. The construction or form of the casing or trunk can be widely varied without altering the spirit of my invention.

The casing or trunk is provided at or near each end with a drum 2, journaled in suitable bearings, and one of the drums is preferably adjustable horizontally through the medium of a screw-bolt 3 and nut 4 or by any other devices suitable for the purpose. The foraminous endless belt 5 extends around the drums 2, and the upper and lower stretches of the belt are supported at suitable intervals between the drums by upper and lower sets of supporting-rollers 6. The conveyer-belt may be of a width substantially the same as the width of the casing or trunk on its interior, and is composed of wire-cloth, or other flexible material having its longitudinal edges provided with reinforcing bands or strips 7, Fig. 3, adapted to travel on the rollers 6. The upper and lower sets of rollers 6 serve to insure a level position of the upper and lower stretches of the endless belt.

The casing or trunk is designed to rest upon a flooring, as at 8, and the interior of the casing or trunk, at the lower portion thereof, is in communication with an air-exhaust apparatus, or suction-fan 9, one or more, which operates to withdraw the air from the interior of the casing or trunk, and to discharge the same at any suitable point, either in the building, or outside the building in which the condenser and gins are located.

The casing is here shown as arranged between two batteries of gins 10, but if one battery of gins is used the casing will be located immediately in rear of the single battery of gins, as will be obvious.

The gins are shown provided with curved delivery conduits or pipes 12, which introduce the lint-cotton through the top wall of the casing. But I do not wish to be understood as confining myself to any particular arrangement of the cotton-inlet conduits or pipes, nor to introducing the lint-cotton into the casing or trunk through the top wall thereof, as obviously the cotton may be introduced at some other suitable point.

The casing or trunk is constructed at its sides with vertical air-chambers 13. (Best seen in Fig. 3.) These air-chambers are each composed of two vertical walls separated a suitable distance apart. The inner walls 14 are provided with openings filled with wire screens, as at 15, and the walls 14, at points below the wire screens 15, are provided with longitudinal air passages or slots 16, located between the upper and lower stretches of the endless foraminous conveyer-belt 5.

In the apparatus constituting the subject-matter of my application for patent hereinbefore referred to, the bulkhead or partition is stationary, but in my present invention I make this partition 17 vertically adjustable, in such manner that its lower horizontal edge can be moved toward or from the uppermost surface of the foraminous belt, in order to control the quantity of cotton passing beneath the bulkhead or partition, whereby a greater or less quantity of cotton can be permitted to pass by the bulkhead or partition for delivery to the cotton compress or baling mechanism. By this adjustment of the bulkhead or partition it is possible to regulate the quantity of cotton supplied by the conveyer-belt to the cotton compress or baling mechanism, and this is very advantageous.

The bulkhead or partition 17, as illustrated in the drawings, is composed of a board wall depending from a cross-bar 18, to the opposite edges of which are secured vertically-arranged wire or other screens 19, preferably provided with V-shaped lower edges, to which are attached reversely-inclined strips 20, so arranged that the apex is at the center of the bulkhead or partition, as will be best understood by reference to Fig. 4. The board wall extends below the strips 20, and it is provided with a horizontal lower edge, under which the cotton is carried by the foraminous belt to be delivered to the cotton compress or baling mechanism.

At opposite sides of the bulkhead or partition are arranged two transverse pickers 21 and 22, between which the bulkhead or partition is vertically adjustable.

The cross-bar 18 of the bulkhead or partition 17 is secured to a cable or cord 23, passing over a guide-pulley 24, mounted on a shaft 25, supported by standards 26 rising from the top wall of the casing or trunk. The cord or cable thence passes over another guide-pulley 27, so that the cable or cord can be operated for the purpose of raising or lowering the bulkhead or partition, as will be obvious.

The devices for raising and lowering the bulkhead or partition are simple and economical in construction, but I do not wish to be understood as limiting myself to any particular means for adjusting the bulkhead or partition in a vertical plane to vary the distance of its lower horizontal edge relatively to the uppermost surface of the traveling foraminous conveyer-belt.

One of the belt-supporting drums 2 is designed to be rotated by suitable mechanism, for the purpose of imparting a horizontally-traveling motion to the foraminous conveyer-belt.

The casing or trunk is provided at one end with a wiper-roll 28, having strips of suitable material to wipe or brush adhering lint-cotton from the foraminous belt and cause the cotton to pass between the wiper-roll and a plain-surfaced pressing-roll 29, journaled above the wiper-roll and driven in any suitable manner, for instance, as in my application before referred to.

Between the wiper-roll 28 and the compress or baling mechanism (not shown) is arranged an endless canvas belt 32, the surface of which is perfectly smooth. This belt is designed to receive the bat from the pressing and wiper rolls, and to convey and deliver the same to the cotton compress or baling mechanism. The smooth surface of the belt 32 obviates any retardation of the delivery of the bat to the cotton compress or baling mechanism that might occur if the cotton were delivered direct from the conveyer-belt 5. The canvas, or similar belt 32, is arranged and operated as in my application for patent before referred to.

In the operation of the improved condenser and lint-cotton conveyer, the lint-cotton is discharged from the battery, or batteries of gins, into the casing or trunk and is deposited on the foraminous belt. A large volume of air is necessarily delivered into the casing or trunk by the gins, but this air is constantly withdrawn by the air-exhaust apparatus or suction-fan 9, which creates suction in the lower portion of the casing or trunk and causes the air to flow through the wire screens 15 and 19 into the air-chambers 13, and from the latter through the passages or slots 16 into the space between the upper and lower stretches of the endless conveyer-belt 5. A certain quantity of of air is also drawn directly downward through the conveyer-belt 5 to the air-exhaust apparatus or suction-fan.

The pickers 21 and 22 are designed to be rotated at high velocity, so that they throw the cotton upward inside of the casing or trunk and keep the surface of the foraminous belt approximately clean for some distance under the pickers, thus leaving a clear space for the escape of dirt which passes through the foraminous conveyer-belt. As the pickers rotate to throw the cotton upward, the cotton will strike the wire screens 19 of the bulkhead or partition, and the dirt or dust contained in such cotton will be drawn through the wire screens 19, and thence through the wire screens 15 into the air-chambers 13. By this means the cotton thrown up by the action of the pickers will strike screened portions and all dirt and dust will be withdrawn from the cotton by the action of the exhaust apparatus or suction-fan.

The arrangement of the screened portions 15 at the ends of the rapidly-rotating pickers 21 and 22 is very advantageous, in that the dirt, dust, and impurities are withdrawn and conducted down into the casing or trunk at a point between the upper and lower horizontal stretches of the conveyer-belt. The air generated by the gin-brushes causes a rush of air through both the wire screens 15 and 19 and through the conveyer-belt, whereby the cotton is effectually cleaned.

As before stated, the cotton is carried by the conveyer-belt to the pressing and wiper rolls, and is by them delivered to the endless belt 32, which is designed to carry the cotton to the cotton compress or baling mechanism. During the time a bale is being removed from the cotton compress or baling mechanism, the passage of the cotton-bat from the storage-condenser should be stopped, and this effected by temporarily stopping the traveling motion of the endless conveyer-belt 5. While the conveyer-belt remains stationary the cotton from the gins is continuously deposited on the conveyer-belt and accumulates thereupon to a greater or less depth, but the air introduced into the casing from the gins is constantly withdrawn by the air-exhaust apparatus or suction-fan 9. When the foraminous conveyer-belt is again started, the mass of cotton thereupon rises to a considerable distance above the level of the lower edge of the bulkhead or partition, but is thrown back and equalized by the picker 22, which levels off the surface of the cotton. As the cotton passes beneath the lower edge of the bulkhead or partition, or as it is in transit toward the pressing-roll 29, after passing the bulkhead or partition, the cotton is subjected to the action of the second rotary picker 21, which operates to agitate and clean the cotton and to distribute it uniformly upon the conveyer-belt 5.

In my present invention I dispense with the rotating foraminous cylinders or drums employed in the apparatuses hereinbefore referred to. By dispensing with the foraminous cylinders or drums I materially simplify the apparatus, and by providing the wire-screen portions on the bulkhead or partition and in the sides of the casing or trunk, as described and shown, I render the apparatus more efficient and satisfactory in practical operation, make it more compact and less expensive and difficult of erection, and materially improve the grade of cotton.

The purpose of arranging the strips 20 in inclined position, as described and shown, is to prevent dirt and dust from lodging and accumulating on the strips. Obviously dirt and dust drawn through the screens and falling on the inclined strips will readily glide down the same and be drawn through the screens 15 into the air-chambers 13, and thence into and from the casing or trunk.

Having thus described my invention, what I claim is—

1. In an apparatus for condensing and delivering lint-cotton to a cotton compress or baling mechanism, the combination with a casing or trunk, a lint-cotton conveyer moving therein, and a picker operating above the said conveyer, of screens forming parts of the casing or trunk and located at the ends of the picker for the passage of dust and dirt from cotton agitated by the picker, and an air-exhaust apparatus or suction-fan connected with the lower portion of the casing or trunk for withdrawing air therefrom through said screens, substantially as described.

2. In an apparatus for condensing and delivering lint-cotton to a cotton compress or baling mechanism, the combination with a casing or trunk having air-chambers in its sides communicating with its interior at the lower portion thereof, a lint-cotton conveyer moving in the casing or trunk, and a pair of pickers operating above the said conveyer, of screens forming parts of the walls of the casing or trunk and located at the ends of the pickers, and an air-exhaust apparatus or suction-fan connected with the lower portion of the casing or trunk for withdrawing air therefrom through said screens, substantially as described.

3. In an apparatus for condensing and delivering lint-cotton to a cotton compress or baling mechanism, the combination with a casing or trunk, and a lint-cotton conveyer moving therein, of a bulkhead or partition adjustable vertically to vary its distance from the conveyer for the purpose of regulating the quantity of cotton supplied by the conveyer to the cotton compress or baling mechanism, pickers operating in the casing or trunk for agitating the cotton, screens arranged in the sides of the casing or trunk for the passage of air and dirt or dust from the interior thereof, and means for causing a current of air to flow through the said screens to carry off the dirt and dust, substantially as described.

4. In an apparatus for condensing and delivering lint-cotton to a cotton compress or baling mechanism, the combination with a casing or trunk, an endless, foraminous belt traveling in the casing or trunk, and pickers operating above the belt, of a bulkhead or partition interposed between the pickers and adjustable vertically to regulate the amount of cotton supplied by the belt to the cotton compress or baling mechanism, and screens arranged in the side walls of the casing or trunk at points in juxtaposition to the pickers and the bulkhead for the passage of air, dirt, and dust from the interior of the casing or trunk, substantially as described.

5. In an apparatus for condensing and delivering lint-cotton to a cotton compress or baling mechanism, the combination with a casing or trunk having air-chambers in its sides, a lint-cotton conveyer moving in the casing or trunk, and a picker operating above the conveyer, of screens forming parts of the walls of the casing or trunk and located at the ends of the picker, and a bulkhead or partition arranged in juxtaposition to the picker and having its lower end terminating in proximity to the conveyer for retarding the mass of cotton accumulating on the conveyer in rear of said bulkhead or partition, substantially as described.

6. In an apparatus for condensing and delivering lint-cotton to a cotton compress or baling mechanism, the combination with a casing or trunk having air-chambers in its sides, an endless foraminous conveyer-belt traveling in the casing or trunk, and a picker operating above the conveyer-belt, of screens forming parts of the walls of the casing or trunk, and located at the ends of the picker, and a bulkhead or partition arranged in juxtaposition to the picker and comprising screens secured at opposite sides of an intermediate wall, the lower edge of which terminates in proximity to the conveyer-belt, substantially as described.

7. In an apparatus for condensing and delivering lint-cotton to a cotton compress or baling mechanism, the combination with a casing or trunk having air-chambers in its sides, a lint-cotton conveyer moving in the casing or trunk, and a picker operating above the conveyer, of screens arranged at the ends of the picker, and a vertically-adjustable bulkhead or partition arranged in juxtaposition to the picker and comprising screens located at opposite sides of an intermediate wall, the lower edge of which terminates in proximity to the conveyer, substantially as described.

8. In an apparatus for condensing and delivering lint-cotton to a cotton compress or baling mechanism, the combination with a casing or trunk, a lint-cotton conveyer moving in the casing or trunk, and a picker operating above the conveyer, of a vertically-movable bulkhead or partition having its lower end terminating in proximity to the conveyer for retarding the mass of cotton accumulating on the conveyer in rear of said bulkhead or partition, means arranged on the exterior of the casing or trunk for vertically adjusting the bulkhead or partition, screens arranged in the side walls of the casing or trunk in juxtaposition to the picker and bulkhead for the passage of air, dirt and dust from the interior of the casing or trunk, and means for causing air to flow through said screens to carry off the dirt and dust, substantially as described.

In testimony whereof I have hereunto set my hand in presence of two subscribing witnesses.

WARREN A. PATTERSON.

Witnesses:
C. M. SELEY,
F. Z. DOCKERY.